United States Patent [19]

Rabatin

[11] Patent Number: 4,603,259

[45] Date of Patent: * Jul. 29, 1986

[54] X-RAY IMAGE CONVERTER DEVICES USING RARE EARTH OXYHALIDE PHOSPHORS

[75] Inventor: Jacob G. Rabatin, Montville, Ohio

[73] Assignee: General Electric Company, Schenectady, N.Y.

[ * ] Notice: The portion of the term of this patent subsequent to Feb. 5, 2002 has been disclaimed.

[21] Appl. No.: 735,305

[22] Filed: May 17, 1985

Related U.S. Application Data

[63] Continuation of Ser. No. 483,343, Apr. 8, 1983, abandoned.

[51] Int. Cl.$^4$ .................................................. G01J 1/58
[52] U.S. Cl. ................................ 250/483.1; 250/487.1
[58] Field of Search ................. 250/483.1, 486.1, 487.1

[56] References Cited

U.S. PATENT DOCUMENTS

| Re. 28,592 | 10/1975 | Rabatin et al. | 252/301.4 H |
|---|---|---|---|
| 2,372,359 | 3/1945 | Cook | 250/487 |
| 3,591,516 | 7/1971 | Rabatin | 252/301.4 R |
| 3,957,675 | 5/1976 | Schutt | 252/586 |
| 4,315,979 | 2/1982 | Brimes et al. | 250/486 |
| 4,347,284 | 8/1982 | Ysutomu et al. | 343/18 R |
| 4,350,893 | 9/1982 | Takahashi et al. | 250/483.1 |
| 4,478,008 | 2/1985 | Rabatin | 250/483.1 |

FOREIGN PATENT DOCUMENTS 2461260  7/1976  Fed. Rep. of Germany.

*Primary Examiner*—Carolyn E. Fields
*Assistant Examiner*—Richard Hanig
*Attorney, Agent, or Firm*—J. F. McDevitt; Philip L. Schlamp; Fred Jacob

[57] ABSTRACT

X-ray image converters using rare earth oxyhalide phosphors activated with terbium and/or thulium ion are described exhibiting improved brightness. Novel reflector means are provided in said x-ray image converter devices which reflect UV radiation incident thereupon back through the phosphor layer to associated readout or recording means sensitive to this wavelength radiation. A multi layer x-ray screen construction utilizing said improved reflector means is also described providing improved image sharpness while further reducing the crossover problem because more reflected UV radiation is being transmitted to an associated photographic film.

9 Claims, 3 Drawing Figures

SCREEN, NO REFLECTOR

SCREEN WITH REFLECTOR

X-RAY IMAGE CONVERTER DEVICES USING RARE EARTH OXYHALIDE PHOSPHORS

CROSS REFERENCE TO RELATED APPLICATION

This application is a continuation, of application Ser. No. 483,343, filed Apr. 8, 1983, now abandoned.

In my pending application Ser. No. 483,335, filed Apr. 8, 1983, which is assigned to the assignee of the present invention, there is described recrystallized rare earth oxyhalide phosphors activated with thulium and/or terbium ion which further contain a replacement metal ion in the phosphor matrix to improve performance when said phosphor materials are employed in x-ray image converter devices. Said recrystallized phosphor particles have an average median particle size in the range extending from approximately 3.0 microns diameter up to approximately 9 microns diameter along with a more narrow particle size distribution which improves the sharpness of the light image generated when x-rays pass through said phosphor medium. The more polyhedral shape of said phosphor particles further results in less light scattering which produces a crossover problem still being encountered in multilayer x-ray screens using the conventional phosphors.

BACKGROUND OF THE INVENTION

The present invention pertains to improvement of the reflector means now used in x-ray image converter devices to reflect the visible light incident thereupon back through the phosphor layer to associated readout or recording means in said device. For example, there is disclosed in published German patent application No. 2,461,260 a reflector layer of titanium dioxide pigment positioned next to the phosphor layer of an x-ray screen using terbium activated rare earth oxyhalide phosphors. While said reflector material has a refractive index in the range 2.6-2.9 and is known to reflect visible light efficiently, it reflects UV radiation very poorly.

Reflector means to reflect both UV radiation and visible radiation in these devices is desirable for several reasons. Rare earth oxyhalide phosphors activated with terbium and/or thulium are known to emit substantial UV radiation when excited by x-rays. For example, it is known that a thulium activated lanthanum oxybromide phosphor emits over 70% of its radiation in the UV region primarily at 305 and 360 nanometer wave lengths. It is also known that a terbium activated lanthanum oxybromide phosphor emits abouts 50% of its radiation at 370 nanometers wavelength. Since this UV radiation contains part of the information generated by x-ray excitation of the phosphor its loss understandably degrades the quality or sharpness of the reproduced image. Conventional rare earth oxyhalide phosphors are also plate-like crystals in shape which at least provides an opportunity for most emission being generated in said medium to be directed toward the recording or readout means of the x-ray image converter device by appropriate physical alignment of said phosphor particles with respect to said imaging means. Since this becomes more difficult to achieve as said phosphor particles become more polyhedral in shape it becomes desirable for all emission generated in such a phosphor medium to reach the imaging means of the device. Accordingly, the optimum reflector means for use with said phosphors should reflect both UV and visible emission efficiently in order to reduce light scattering as well as reduce the crossover problem still being encountered with conventional multilayer x-ray screens.

It is an important object of the present invention, therefore, to improve the reflector means of an x-ray image converter device using rare earth oxyhalide phosphors for increased image brightness.

It is another important object of the invention to improve the reflector means of an x-ray image converter device using said phosphors by efficiently reflecting both UV and visible radiation incident thereupon back through the phosphor layer in said device.

Still another important object of the present invention is to provide a multilayer screen construction using these phosphors with increased image sharpness.

These and other important objects of the invention will be apparent from the following detailed description provided upon the preferred embodiments.

SUMMARY OF THE INVENTION

In its most general form, an x-ray image converter exhibiting improved brightness is provided having a phosphor layer positioned adjacent a reflector layer which reflects incident ultraviolet radiation back through said phosphor layer, said phosphor layer comprising well formed crystals having the following structural formula:

$$LnOX:T_x$$

wherein
  Ln is one or more of La and Gd,
  X is one or more of Cd and Br, and
  $T_x$ is an activator ion selected from Tb and Tm, including mixtures thereof,
and with said reflector layer comprising smaller particle size crystals of an inorganic crystalline solid exhibiting high reflectance in the 300–400 nanometer wavelength spectral region. Said particulate reflector material also desirably exhibits a refractive index of at least 2.0 so that visible light impinging upon said reflector layer is also efficiently reflected back in the direction of the imaging means with minimum scattering or diffusion. Maintaining the particle size of said reflector particulates between about 0.2 micron up to about 0.8 micron further increases the desired back reflection of light and UV radiation through said phosphor layer in accordance with optical principles. Useful inorganic particulates having all these characteristics can be selected from crystalline solids not absorbing radiation strongly at wave lengths below 400 nanometers wavelength and includes such diverse materials as $Sb_2O_3$, unactivated lanthanum oxybromide phosphor, $ZrO_2$, and $BaSO_4$. Reflector materials for efficient back reflection of visible radiation are desirably of a white or light color so as not to absorb said incident radiation. On the other hand, certain white color materials, such as $BaSO_4$ and MgO, which reflect UV radiation efficiently in the desired direction provide only diffuse reflectance of visible radiation, hence lead to poorer image quality than is otherwise obtainable in accordance with the present invention.

Preferred rare earth oxyhalide phosphor materials useful in practicing the present invention comprise lanthanum and gadolinium oxybromide activated with terbium and/or thulium ion, including mixtures thereof. Said terbium activated phosphor utilizes terbium ion at a concentration range from about 0.0001 to about 0.10 mole per mole of the selected oxybromide material. Correspondingly, the thulium activated phosphor material utilizes thulium in the range from about 0.0001 to about 0.1 mole per mole of the selected oxybromide material. Especially preferred phosphor materials of this type have a more polyhedral crystal shape in order to provide better light transmission and less light scattering from the phosphor layer. Said improved phosphors incorporate a plus 3 valence metal ion other than an activator ion in the phosphor matrix in amounts from a small but effective amount up to approximately 0.2 mole per mole of phosphor. Suitable replacement metal ions include scandium, yttrium, ytterbium, lutetium with said recrystallized phosphor crystals having an average median particle size in the range extending from approximately 3.0 microns diameter up to approximately 9.0 microns diameter. The maximum concentration levels found useful for said replacement metal ions in the phosphor material in terms of mole per mole of phosphor are 0.005 for scandium, 0.2 for yttrium, 0.01 for ytterbium, and 0.2 for lutetium.

In a preferred multilayer x-ray screen embodiment of the present invention there is a provided a photographic film having emulsion layers disposed on each major surface and separated by an optically transparent support, a pair of phosphor layers positioned one on each side of said photographic film to form a sandwich configuration, and with said phosphor layers comprising recrystallized phosphor crystals containing said replacement metal ions, and a pair of reflector layers positioned one on each side of said phosphor layers furthest removed from said photographic film, said reflector layers comprising smaller particle size crystals of the above identified inorganic crystalline solids exhibiting high reflectance in the 300-400 nanometers spectral region. Said preferred embodiment further includes incorporation of a UV absorbing dye in the otherwise transparent support layer of the photographic film member which further cooperates in reducing the amount of emitted radiation which can cross over to the more remote emulsion layer. A reduction in said crossover problem is experienced with the present improvement due to more UV radiation being reflected back through the phosphor layer to the associated photographic film.

DESCRIPTION OF THE PREFERRED EMBODIMENTS

Figure 1:
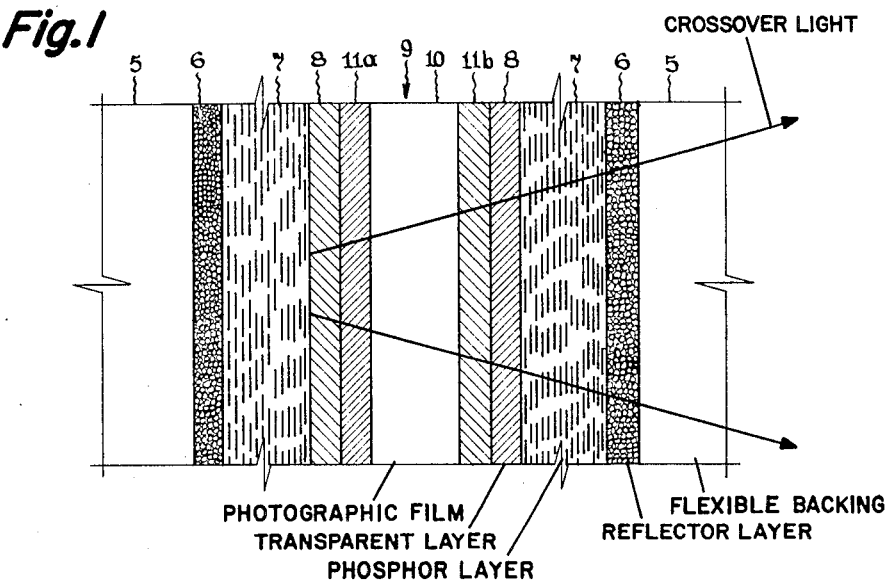
FIG. 1 is a cross section of multilayer x-ray screen construction incorporating the presently improved reflector means to increase the optical quality of the reproduced light image.

Referring to FIG. 1, a multilayer x-ray screen construction is depicted in cross section having a double emulsion photographic film 9 which has an optically transparent polyester base 10 incorporating a dye system which absorbs both ultraviolet and visible emission ordinarily crossing over from one of the silver halide emulsion layers to the other, 11a to 11b, and vice-versa. Such emission crossover causes widening of images and blurring due to lack of alignment or registry between the images reproduced on the particular emulsion layer being exposed and the more remote emulsion layer receiving the crossover image. This is illustrated by the crossover rays passing from emulsion layer 11a to 11b in the depicted embodiment. As will be appreciated, there is an enlarged image on the emulsion layer 11b which will be read as a blurring effect after the film has been developed. Said crossover problem is ameliorated in accordance with the present invention by reflector means which reflects back more UV radiation to the emulsion layer 11a being exposed than is conventionally transmitted. Still further reduction in said crossover problem can be attained by also selecting phosphor particles having a more polyhedral shape which reduces light scattering in the x-ray excited phosphor layer. As further shown in said drawing, the preferred x-ray screen member includes a flexible backing 5 which supports a pair of the present reflecting layers 6 positioned adjacent the exterior-most major surfaces of said phosphor layers 7. Customary transparent layers 8 are included in the x-ray screen embodiment to resist mechanical abrasion of the photographic film and/or phosphor layers during physical movement therebetween.

Figure 2:
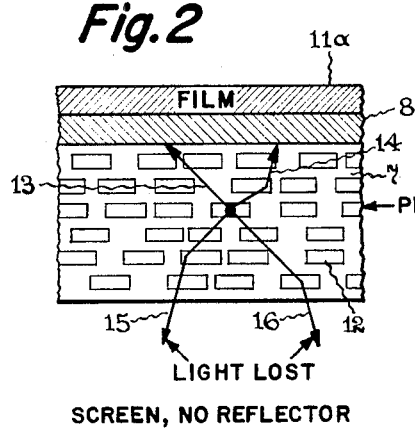
FIG. 2 is a more detailed cross sectional view depicting the light path through an individual phosphor layer not having the improved reflector means of the present invention.

In FIG. 2, there is shown a phosphor layer 7 and transparent layer 8 of the FIG. 1 embodiment but which does not include an associated reflector layer 6. Accordingly, the rare earth oxyhalide phosphor particles 12 are packed generally parallel to the principal or longitudinal axis of the associated photographic emulsion layer 11a. This results in random paths 13-16 through the phosphor layer for both ultraviolet and visible emission produced when x-rays excite said phosphor layer. As can be observed, ultraviolet ray 13 and light ray 14 are both directed forwardly to said emulsion layer while ultra violet ray 15 and light ray 16 are directed away from the film hence cannot form part of the reproduced image. This loss of phosphor emission is undesirable since part of the information contained in the x-ray image will also be lost unless redirected back to the associated imaging means.

Figure 3:
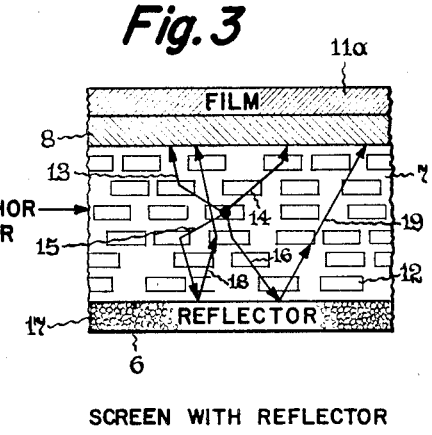
FIG. 3 is another detailed cross sectional view depicting the improved light path attributable to the present reflector means.

There is shown in FIG. 3 the means whereby more phosphor emission is directed toward the photographic film in accordance with the present invention. More particularly, the phosphor layer 7 depicted in the FIG. 2 embodiment along with transparent layer 8 and emulsion layer 11a now further includes a reflector layer 6 incorporating the present reflecting particulates 17. As a result, both ultraviolet ray 15 and light ray 16 are reflected back through the phosphor layer as depicted by rays 18 and 19, respectively, for eventual impingement upon the associated emulsion layer 11a. Said reflector particulates 17 are of a smaller particle size than the phosphor crystals 12 to promote maximum reflection of UV radiation whereas a refractive index of at least 2.0 for said reflector particulates imparts maximum back reflection of visible radiation with minimum light scattering. Still further selection of white color particulates avoids substantial light absorption by said reflector medium.

As previously mentioned, the present invention resides in the improved reflector means for x-ray image converter device using rare earth oxyhalide phosphors. To better illustrate the performance characteristics of the present reflector means, certain test results are provided in Tables I and II below for various particulates enhancing brightness of the reproduced image. In Table I there is shown UV reflectance measurements for representative reflector materials along with refractive indices evidencing relative ability for said materials to reflect light back through the phosphor layer with minimum diffuse scattering. A further comparative evaluation is provided in Table II between a conventional $TiO_2$ x-ray screen reflector compared with the improved reflector materials reported in Table I.

TABLE I

| EXAMPLE | REFLECTOR MATERIAL | REFRACTIVE INDEX | UV REFLECTANCE (%) | | |
|---|---|---|---|---|---|
| | | | 300 nm | 350 nm | 400 nm |
| 1 | $ZrO_2$ | 2.12–2.20 | 89 | 93 | 97 |
| 2 | $Sb_2O_3$ | 2.18–2.35 | 53 | 75 | 79 |
| 3 | Unactivated LaOBr | 2.1 | 110 | 110 | 110 |
| 4 | Milled LaOBr Phosphor | 2.1 | 110 | 110 | 110 |

It can be noted from the measurements reported in Table I above that all of the illustrated materials exhibit a refractive index of at least 2.0 and reflect back a major part of incident UV radiation below 400 nanometers wavelength.

TABLE II

| EXAMPLE | Phosphor Coating Weight ($Mg/Cm^2$) | Reflector Material (Relative Speed) | | | |
|---|---|---|---|---|---|
| | | $TiO_2$ | Unactivated LaOBr | $Sb_2O_3$ | $ZrO_2$ |
| 5 | 30 | 1.0 | 1.27 | 1.18 | 1.18 |
| 6 | 60 | 1.7 | 2.00 | 1.82 | 1.87 |
| 7 | 75 | 2.0 | 2.18 | 2.12 | 2.10 |

For the measurements given in Table II above, conventional x-ray screens were constructed with the phosphor: LaOBr:0.003Tm at the reported phosphor coating weights for test evaluation of the listed reflector materials. As can be noted, unactivated LaOBr phosphor was found to be most effective in improving the quality of the reproduced image.

It will be apparent from the foregoing description that both novel reflector means and x-ray image converter devices utilizing said reflector means have been provided exhibiting improved performance characteristics. It should be appreciated from said description, however, that a comparable improvement can be provided with rare earth oxyhalide phosphors other than above specifically disclosed. It is intended to limit the present invention, therefore, only by the scope of the following claims.

What I claim is new and desire to secure by Letters Patent of the United States is:

1. An x-ray image converter exhibiting improved brightness having a phosphor layer positioned adjacent a reflector layer which reflects both increased incident UV radiation and visible light back through said phosphor layer responsive to excitation of said phosphor by x-rays to an operatively associated photographic film, said phosphor layer comprising well formed crystals having the following structural formula:

$$LnOX:T_x$$

wherein
Ln is one or more of La and Gd,
X is one or more of Cl and Br, and
$T_x$ is an activator ion selected from Tb and Tm, including mixtures thereof, and with said reflector layer comprising crystals of an inorganic crystalline solid selected from the group consisting of $Sb_2O_3$, unactivated lanthanum oxybromide phosphor, $ZrO_2$, and $BaSO_4$ having a particle size between about 0.2 micron up to about 0.8 micron.

2. An x-ray image converter as in claim 1 wherein said phosphor crystals have been recrystallized to provide the structural formula:

$$LnOX:T_x,Z$$

wherein
Ln is one or more of La and Gd,
X is one or more of Cl and Br,
$T_x$ is an activator selected from Tb and Tm, and
Z is a plus three valence metal ion other than an activator ion which substitutes for Ln ion in an amount from a small but effective amount up to approximately 0.2 mole per mole of phosphor.

3. An x-ray image converter as in claim 2 wherein said recrystallized phosphor crystals have an average median particle size in the range extending from approximately 3.0 microns diameter up to approximately 9.0 microns diameter.

4. An x-ray image converter as in claim 2 wherein Z is Sc in an amount up to approximately 0.005 mole per mole of phosphor.

5. An x-ray image converter as in claim 2 wherein Z is Y in an amount up to approximately 0.2 mole per mole of phosphor.

6. An x-ray image converter as in claim 2 wherein Z is Yb in an amount up to approximately 0.01 mole per mole of phosphor.

7. An x-ray image converter as in claim 2 wherein Z is Lu in an amount up to approximately 0.2 mole per mole of phosphor.

8. A multilayer x-ray screen construction exhibiting improved brightness which comprises:
(a) a photographic film havng emulsion layers disposed on each major surface and separated by an optically transparent support,
(b) a pair of phosphor layers being positioned one on each side of said photographic film to form a sandwich configuration, said phosphor layers comprising recrystallized phosphor crystals having the structural formula:

$$LnOX:T_x,Z$$

wherein
Ln is one or more of La and Gd
X is one or more of Cl and Br
$T_x$ is an activator selected from Tb and Tm, and
Z is a plus three valence metal ion other than an activator ion which substitutes for Ln ion in an amount up to approximately 0.2 mole per mole of phosphor, and (c) a pair of reflector layers positioned one on each side of said phosphor layers furthest removed from said photographic film to reflect both increased incident UV radiation and visible light back through said phosphor layers responsive to excitation of said phosphor layers by x-rays, said reflector layers comprising crystals of an inorganic crystalline solid selected from the group consisting of $Sb_2O_3$, unactivated lanthanum oxybromide phosphor, $ZrO_2$ and $BaSO_4$ having a particle size between about 0.2 micron up to about 0.8 micron.

9. A multilayer x-ray screen as in claim 8 wherein said recrystallized phosphor particles have an average median particle size in the range extending from approximately 3.0 microns diameter up to approximately 9.0 microns diameter.

* * * * *